United States Patent
Lin

(10) Patent No.: US 11,197,185 B2
(45) Date of Patent: Dec. 7, 2021

(54) NR CSI-RS BASED BEAM FAILURE DETECTION/RADIO LINK MONITORING IN FR2

(71) Applicant: MEDIATEK INC., Hsin-Chu (TW)

(72) Inventor: Hsuan-Li Lin, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 71 days.

(21) Appl. No.: 16/835,744

(22) Filed: Mar. 31, 2020

(65) Prior Publication Data

US 2020/0314676 A1    Oct. 1, 2020

Related U.S. Application Data

(60) Provisional application No. 62/827,250, filed on Apr. 1, 2019, provisional application No. 62/842,631, filed on May 3, 2019.

(51) Int. Cl.
*H04W 24/10* (2009.01)
*H04L 5/00* (2006.01)

(52) U.S. Cl.
CPC .......... *H04W 24/10* (2013.01); *H04L 5/0057* (2013.01); *H04L 5/0094* (2013.01); *H04L 5/0007* (2013.01)

(58) Field of Classification Search
CPC ............................ H04W 24/10; H04L 5/0007
USPC ........................................................ 370/252
See application file for complete search history.

(56) References Cited

U.S. PATENT DOCUMENTS

| 2019/0058517 A1 | 2/2019 | Kang et al. |
| 2020/0221428 A1 | 7/2020 | Moon et al. |

FOREIGN PATENT DOCUMENTS

| CN | 108199819 A | 2/2018 |
| CN | 109302272 A | 2/2018 |
| CN | 109315009 A | 9/2018 |
| WO | WO2019031850 A1 | 8/2017 |

OTHER PUBLICATIONS

International Search Report and Written Opinion of International Search Authority for PCT/CN2020/082680 dated Jun. 30, 2020 (9 pages).
R1-1807853 3GPP TSG RAN WG1 Meeting #93, Intel Corporation, Summary of Offline Discussion for NR Radio Link Monitoring, Busan, South Korea, May 21-25, 2018 (11 pages) *sections 2-3*.

*Primary Examiner* — Angel T Brockman
(74) *Attorney, Agent, or Firm* — Imperium Patent Works; Zheng Jin

(57) ABSTRACT

Apparatus and methods are provided for NR CSI-RS based BFD/RLM in FR2. In one novel aspect, BFD in FR2, the evaluation period is extended by the N factor if the CSI-RS for BFD is in a resource set configured with repetition ON or the BFD is performed on CSI-RS#1 without beam information or, where the CSI-RS#1 is configured without beam information if CSI-RS for BFD is not QCL-TypeD with SSB for L1-RSRP beam reporting, nor the CSI-RS for BFD is not QCL-TypeD with CSI-RS for L1-RSRP beam reporting. In one embodiment, the N factor equals to 1 only when at least one predefined RX beam information is included in the RRC configuration. In another embodiment, the predefined RX beam information for BFD is Type-D QCL information for a synchronization signal block (SSB) configured in its TCI state or the CSI-RS#1 is configured with repetition ON.

16 Claims, 5 Drawing Sheets

NR CSI-RS BASED BEAM FAILURE DETECTION/RADIO LINK MONITORING IN FR2

CROSS REFERENCE TO RELATED APPLICATIONS

This application claims priority under 35 U.S.C. § 119 from U.S. Provisional Application No. 62/827,250 filed on Apr. 1, 2019, titled "NR CSI-RS BFD/RLM IN FR2," and U.S. Provisional Application No. 62/842,631, filed on May 3, 2019, titled "NR CSI-RS BFD/RLM IN FR2," the subject matters of which are incorporated herein by reference.

TECHNICAL FIELD

The disclosed embodiments relate generally to wireless communication, and, more particularly, to NR CSI-RS based BFD/RLM in FR2.

BACKGROUND

The bandwidth shortage increasingly experienced by mobile carriers has motivated the exploration of the new radio (NR) network with multi-beam technology. In the NR network, the measurement for uplink (UL) and downlink (DL) and the measurement report needs to adapt to meet the requirement. For beam failure detection (BFD), when the gNB, via radio resource control (RRC) configuration, configures the UE with BFD reference signals (RS). The BFD RS can be either synchronization signal block (SSB) or channel state information RS (CSI-RS). The UE measurements the BFD RS for an evaluation time based on a predefined evaluation period. The value of $T_{Evaluate\_BFD\_CSI-RS}$ is defined in the specification. The UE declares beam failure when the number of beam failure instance indications from the physical layer reaches a configured threshold before a configured timer expires. In other scenarios, the RS for BFD/radio link monitoring (RLM) is not explicitly configured in the RRC configuration. The traditional way of using the defined evaluation time period may not work for some scenarios in the multi-beam environment.

Improvements and enhancements are required for NR CSI-RS based BDF/RLM in FR2.

SUMMARY

Apparatus and methods are provided for NR CSI-RS based BFD/RLM in FR2. In one novel aspect, BFD in FR2, the evaluation period is extended by the N factor if the CSI-RS for BFD is in a resource set configured with repetition ON or the BFD is performed on CSI-RS#1 without beam information or, where the CSI-RS#1 is configured without beam information if CSI-RS for BFD is not QCL-TypeD with SSB for L1-RSRP beam reporting, nor the CSI-RS for BFD is not QCL-TypeD with CSI-RS for L1-RSRP beam reporting. In one embodiment, the UE receives RRC configuration, which includes RS configured in a control resource set (CORESET) active transmission configuration indication (TCI), determines an evaluation period extending N factor for beam failure detection (BFD) performed on the RS in the configured active TCI of the CORESET for frequency range-2 (FR2) based on the RRC configuration, wherein the N factor equals to 1 only when at least one predefined RX beam information is included in the RRC configuration, and performs BFD on the configured RS based on the determined N factor. In one embodiment, the BFD is performed on the RS in the configured active TCI of the CORESET when a BFD RS is explicitly configured in the RRC configuration. In another embodiment, the BFD is performed on the RS in the configured active TCI of the CORESET when there is no BFD RS configured in the RRC configuration. In one embodiment, the RS is a control state information RS (CSI-RS) in a CSI-RS resource set, and wherein the CSI-RS is configured in its TCI state with Type-D quasi-location (QCL) information. In another embodiment, the predefined RX beam information for BFD is Type-D QCL information for a synchronization signal block (SSB) configured in its TCI state. In yet another embodiment, the predefined RX beam information for BFD is the CSI-RS is configured with repetition ON, and wherein N factor equals to 1 when a number of symbols in the CSI-RS resource set is greater than a number of RX beams for the UE. In one embodiment, the predefined RX beam information for BFD is the CSI-RS configured with repetition ON. In another embodiment, the configured active TCI of the CORESET is activated by MAC-CE command.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
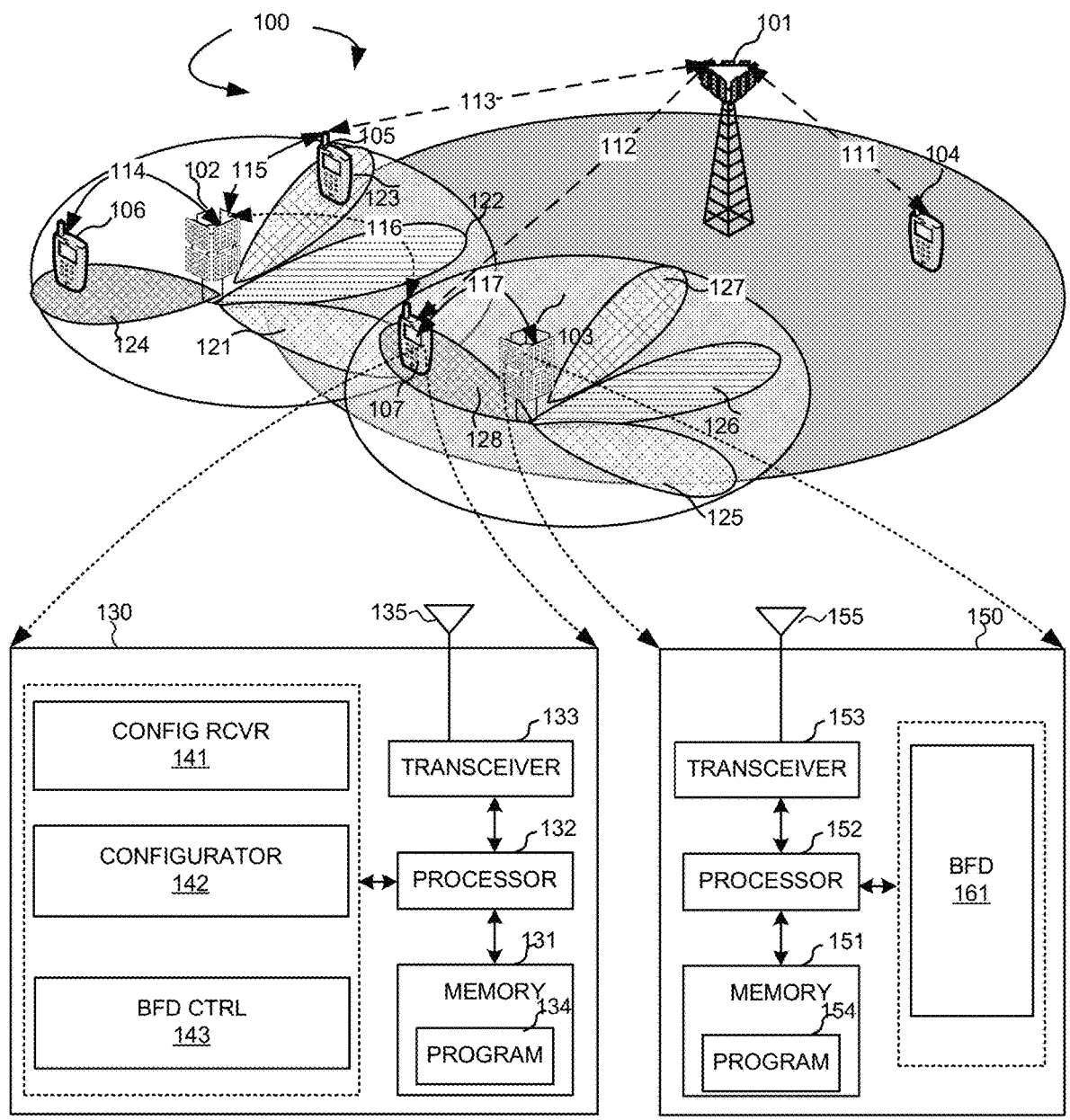
FIG. 1 is a schematic system diagram illustrating an exemplary wireless network with NR CSI-RS based BFD/RLM in FR2 in accordance with embodiments of the current invention.

FIG. 1 is a schematic system diagram illustrating an exemplary wireless network with NR CSI-RS based BFD/RLM in FR2 in accordance with embodiments of the current invention. NR wireless system 100 includes one or more fixed base infrastructure units forming a network distributed over a geographical region. The base unit may also be referred to as an access point, an access terminal, a base station, a Node-B, an eNode-B, or by other terminology used in the art. As an example, base stations 101, 102 and 103 serve several mobile stations 104, 105, 106 and 107 within a serving area, for example, a cell, or within a cell sector. In some systems, one or more base stations are coupled to a controller forming an access network that is coupled to one or more core networks. eNB 101 is a conventional base station served as a macro eNB. eNB 102 and eNB 103 are multibeam base station, the serving area of which may overlap with the serving area of eNB 101, as well as may overlap with each other at the edge. If the serving area of multibeam eNB does not overlap the serving area of macro eNB, the multibeam eNB is considered as standalone, which can also provide service to users without the assistance of macro eNB. multibeam eNB 102 and multibeam eNB 103 has multiple sectors each with multiple control beams to cover a directional area. Control beams 121, 122, 123 and 124 are exemplary control beams of eNB 102. Control beams 125, 126, 127 and 128 are exemplary control beams of eNB 103. As an example, UE or mobile station 104 is only in the service area of eNB 101 and connected with eNB 101 via a link 111. UE 106 is connected with multibeam NR base station only, which is covered by control beam 124 of eNB 102 and is connected with eNB 102 via a link 114. UE 105 is in the overlapping service area of eNB 101 and eNB 102. In one embodiment, UE 105 is configured with dual connectivity and can be connected with eNB 101 via a link 113 and eNB 102 via a link 115 simultaneously. UE 107 is in the service areas of eNB 101, eNB 102, and eNB 103. In embodiment, UE 107 is configured with dual connectivity and can be connected with eNB 101 with a link 112 and eNB 103 with a link 117. In one embodiment, UE 107 can switch to a link 116 connecting to eNB 102 upon connection failure with eNB 103.

FIG. 1 further illustrates simplified block diagrams 130 and 150 for UE 107 and eNB 103, respectively. Mobile station 107 has an antenna 135, which transmits and receives radio signals. A RF transceiver module 133, coupled with the antenna, receives RF signals from antenna 135, converts them to baseband signal, and sends them to processor 132. RF transceiver 133 also converts received baseband signals from processor 132, converts them to RF signals, and sends out to antenna 135. Processor 132 processes the received baseband signals and invokes different functional modules to perform features in mobile station 107. Memory 131 stores program instructions and data 134 to control the operations of mobile station 107.

Mobile station 107 also includes multiple function modules that carry out different tasks in accordance with embodiments of the current invention. These function modules can be implemented in software, firmware or hardware. Configuration circuit 141 receives radio resource control (RRC) configuration, wherein the RRC configuration includes reference signal (RS) configured in a control resource set (CORESET) active transmission configuration indication (TCI). Configurator 142 determines an evaluation period extending N factor for beam failure detection (BFD) performed on the RS in the configured active TCI of the CORESET for frequency range-2 (FR2) based on the RRC configuration, wherein the N factor equals to 1 only when at least one predefined RX beam information is included in the RRC configuration. BFD controller 143 performs BFD on the configured RS based on the determined N factor.

Similarly, eNB 103 has an antenna 155, which transmits and receives radio signals. An RF transceiver module 153, coupled with the antenna, receives RF signals from antenna 155, converts them to baseband signals, and sends them to processor 152. RF transceiver 153 also converts received baseband signals from processor 152, converts them to RF signals, and sends out to antenna 155. Processor 152 processes the received baseband signals and invokes different functional modules to perform features in eNB 103. Memory 151 stores program instructions and data 154 to control the operations of eNB 103. eNB 103 also includes multiple function modules that carry out different tasks in accordance with embodiments of the current invention. BFD module 161 communicates with the UEs and performs BFD configuration, measurement and reporting procedures.

Candidate beam detection is an important for link recovery. The CBD can be based on synchronization signal block (SSB) or channel station information reference signal (CSI-RS) measurements. Through CBD measurement, the UE can report good beam to the network once the beam failure is detected. The beam failure recovery (BFD) is to monitor radio link quality of a beam. BFD would trigger beam failure and link recovery procedure. In one embodiment, upon detecting a beam failure during the BFD, the CBD is triggered. UE performs CBD measurement during a CBD evaluation period. The evaluation period of CBD needs to consider both the requirement for fast beam recovery as well as power consumption.

For BFD-RS in the set q0, the UE assesses the radio link quality only according to periodic CSI-RS resource configurations or SS/PBCH blocks that are quasi co-located, with the demodulation RS (DM-RS) of physical downlink control channel (PDCCH) receptions monitored by the UE. However, it is not necessary the RX beam for PDCCH-DMRS is always known to UE. One example when a CSI-RS is configured for L1-RSRP reporting but its TCI state is not provided. In this case, RX beam sweeping should be allowed for UE to find the proper RX beam for the reception of the CSI-RS. However, it is still possible the CSI-RS is also used as BFD-RS. If CSI-RS#1 is configured for the TCI state for PDCCH, and the RRC configuration configures BFD RS (failureDetectionResources) as CSI-RS#1 or the BFD RS is not configured, then UE will perform BFD on the CSI-RS#1. But at the same time, the CSI-RS#1 is configured for L1-RSRP reporting and its TCI state is not provided, then the RX beam sweeping is used for CSI-RS#1 with the evaluation period extending N factor set to be greater than one. In one novel aspect, BFD in FR2, the evaluation period should be extended by N (e.g. N=8) if the BFD is performed on CSI-RS#1 without beam information or the CSI-RS for BFD is in a resource set configured with repetition ON. The CSI-RS#1 is configured without beam information if the CSI-RS for BFD is not QCL-TypeD and at different OFDM symbols (TDMed) with SSB for L1-RSRP beam reporting, nor the CSI-RS for BFD is not QCL-TypeD and TDMed with another CSI-RS configured for L1-RSRP beam reporting.

Figure 2:
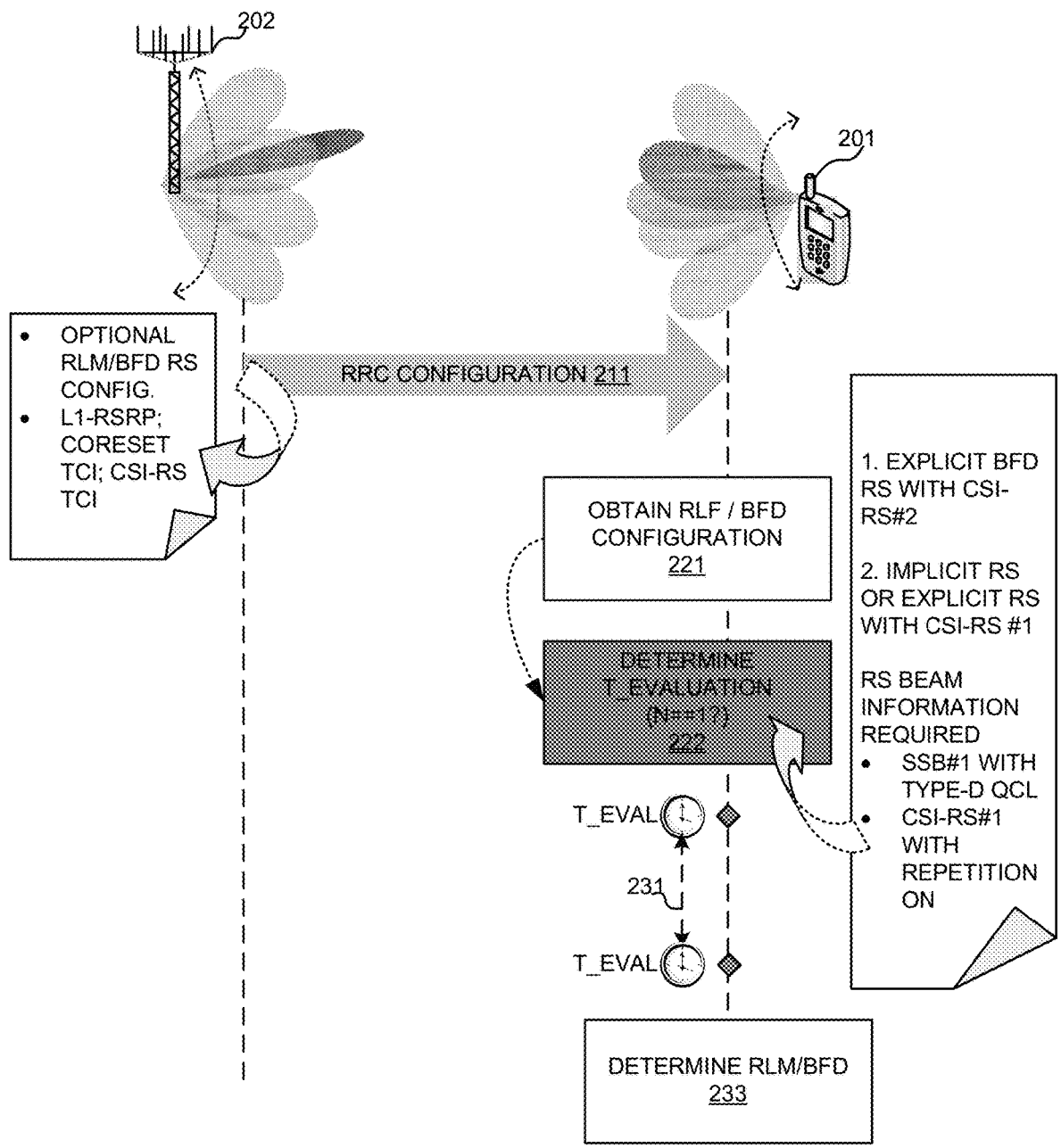
FIG. 2 illustrates exemplary diagrams for a UE to perform BFD/RLM in FR2 in accordance with embodiments of the current invention.

FIG. 2 illustrates exemplary diagrams for a UE to perform BFD/RLM in FR2 in accordance with embodiments of the current invention. UE 201 is connected with a serving cell gNB 202 in a NR network. The UE may operate in frequency range-1 (FR1), which is in the range of smaller than 6 GHZ or 7 GHz. The UE may also operate in frequency range-2 (FR2), which is in the range of about 28 GHz where millimeter wave (mmW) resides. The UE performs measurement based on L1-RSRP resources such as the synchronization signal block (SSB) resources or the channel state information reference signal (CSI-RS) resources. The SS/PBCH block (SSB) burst consists of multiple SSB-s, which are associated with the different SSB indices and potentially with the different transmission beams. Besides, the CSI-RS signals can also be configured for beam management and measurement. UE 201 can perform measurements on neighbor cell beams, both in the FR1 and FR2. In an NR network, the UE is configured with BFD evaluation timer $T_{Evaluate\_BED\_CSI-RS}$. The UE 201 determines a BFD RS to perform BFD measurement during the $T_{Evaluate\_BFD\_CSI-RS}$ if certain predefined criteria are met. If the predefined criteria are not met the $T_{Evaluate\_BFD\_CSI-RS}$ may be extended by an N factor.

It is advantageous to perform the BFD with the N factor equals to one. In one embodiment, when the BFD RS is not explicitly configured in the RRC configuration or when the explicitly configured BFD RS being the CSI-RS configured in the active TCI State of CORESET, additional beam information is required in the RRC configuration. At step 211, the UE receives RRC configuration. In one embodiment, the RRC configuration explicitly includes the BFD RS configuration. If the RRC Configuration the configures the failureDetectionResources to be CSI-RS#1, which is in the active TCI state of the CORESET, further beam information is needed to perform the BFD with N factor equals one. In another embodiment, the RRC configuration may not explicitly includes the BFD RS configuration. UE 201 upon receiving the RRC configuration, implicitly configures the BFD RS to be CSI-RS#1, which is in the active TCI state of the CORESET, further beam information is needed to perform the BFD with N factor equals one.

Upon receiving the RRC configuration, at step 221, the UE obtains RLF/BFD configuration from the RRC configuration. Based on the obtained configuration information, at step 222, UE 201 determines BFD evaluation period. In particular, the evaluation period extending N factor is determined based on the obtained BFD configuration. In one novel aspect, beam information for the BFD RS are included or are mandatory in the RRC configuration if the BFD RS is either implicitly configured or explicitly configured with the BFD RS being the CSI-RS#1 in the active TCI state of the CORESET. In the first scenario, the BFD RS is explicitly configured in the RRC configuration. The BFD RS is configured to be CSI-RS#2, which is not in the active TCI state of the CORESET. In this scenario, the N factor can be equals to one. In the second scenario, the BFD RS is either implicitly configured or explicitly configured with the BFD RS being the CSI-RS#1. In one embodiment, in the scenario, beam information is provided in the RRC configuration. The BFD RS beam information can be configured with SSB#1 with type-D QCL. The BFD RS beam information can be configured with CSI-RS#1 being configured with repetition ON. With the type-D QCL for SSB#1 or the CSI-RS#1 with repetition ON, the UE obtains the beam information for CSI-RS#1 and the N factor for the evaluation period for BFD equals to one. At step 231, the evaluation timer is started. In one embodiment, the evaluation timer is $T_{Evaluate\_BFD\_CSI-RS}$ as defined and is extended by the N factor. The UE performs BFD measurements for the evaluation period. In another embodiment, if the N factor is greater than one, the BFD is not performed on the CSI-RS#1. When the evaluation timer expires, at step 233, based on the measurement, the UE determines whether there is a beam failure or radio link failure.

Figure 3:
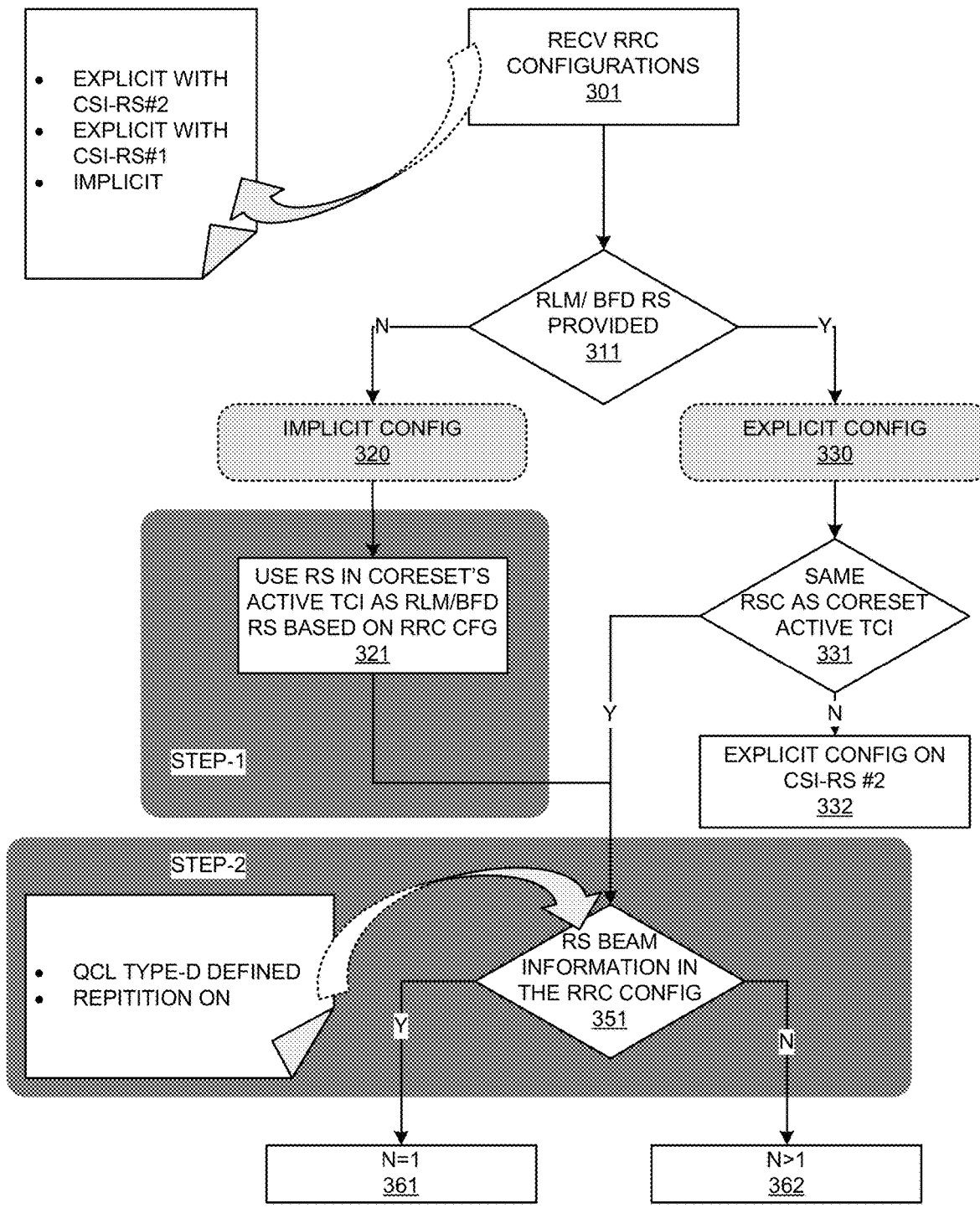
FIG. 3 illustrates exemplary diagrams for the UE to determine the BFD evaluation period based on the RRC configuration in accordance with embodiments of the current invention.

FIG. 3 illustrates exemplary diagrams for the UE to determine the BFD evaluation period based on the RRC configuration in accordance with embodiments of the current invention. At step 301, the UE receives RRC configuration. CSI-RS#1 is configured in the active TCI state for the CORESET. In one embodiment, configurations for L1-RSRP, CORESET TCI, and CSI-RS TCI are mandatory for the RRC configuration. In the first scenario, the BFD RS can be explicitly configured with CSI-RS#2, which is different from CSI-RS#1. In second scenario, the BFD RS is explicitly configured with CSI-RS#1. In the third scenario, the BFD RS is implicitly configured, and the UE uses the CSI-RS#1 as the BFD RS. In the second and the third scenario, to obtain the N factor to be one for the BFD, the RRC configuration is required to include the mandatory configurations of beam information for the BFD RS. At step 311, the UE, upon receiving the RRC configuration, determines whether the RLF/BFD configuration is provided by the RRC configuration. If step 311 determines no, the UE determines at step 320 that the BFD RS is implicitly configured. If step 311 determines yes, the UE determines at step 330 that the BFD RS is explicitly configured.

If the BFD RS is implicitly configured, the UE performs the step-1 determination. At step 321, the UE configures the BFD RS to be CSI-RS#1 and PDCCH (CORESET), CSI-RS#1 is configured in its TCI state with 'Type D' QCL information. The UE subsequently performs the step-2 determination. At step 351, the UE determines if the BFD RS beam information is included in the RRC configuration. In one embodiment, the BFD RS beam information is included when SSB#1 is configured in its TCI state with 'Type D' QCL information. If include, step 351 determines yes and the N factor equals one. In this scenario, the SSB#1 is configured for L1-RSRP via RRC signaling. In another embodiment, the BFD RS beam information is provided, the TCI state of the BFD RS (i.e. CSI-RS#1) is configured as 'Type D' QCL information with CSI-RS resource set #2, which is configured with repetition ON. If CSI-RS#1 in a CSI-RS resource set #1 which is configured with repetition ON and the number of symbols in the CSI-RS resource set #1 (N1) is larger than the number of UE RX beams (N2) (maxNumberRxBeam), the N factor equals one. In this scenario, CSI-RS resource set #1 is configured for L1-RSRP via RRC signaling. If step 351 determines no, the N factor is greater than one.

If the BFD RS is explicitly configured at step 331, the UE determines if the explicitly configure BFD RS is the same resource as the CSI-RS#1. If yes, the UE performs the same step-2 determines to determine whether the N factor equals to one. If step 331 determines no, the UE, at step 332 performs BFD on the explicitly configured CSI-RS#2. In one embodiment, the N factor can be set to be one, when the BFD-RS is configured as 'Type D' QCL information with CSI-RS#2 in the active TCI state of a CORESET, and the beam information configuration for CSI-RS#2 is not provided.

Figure 4:
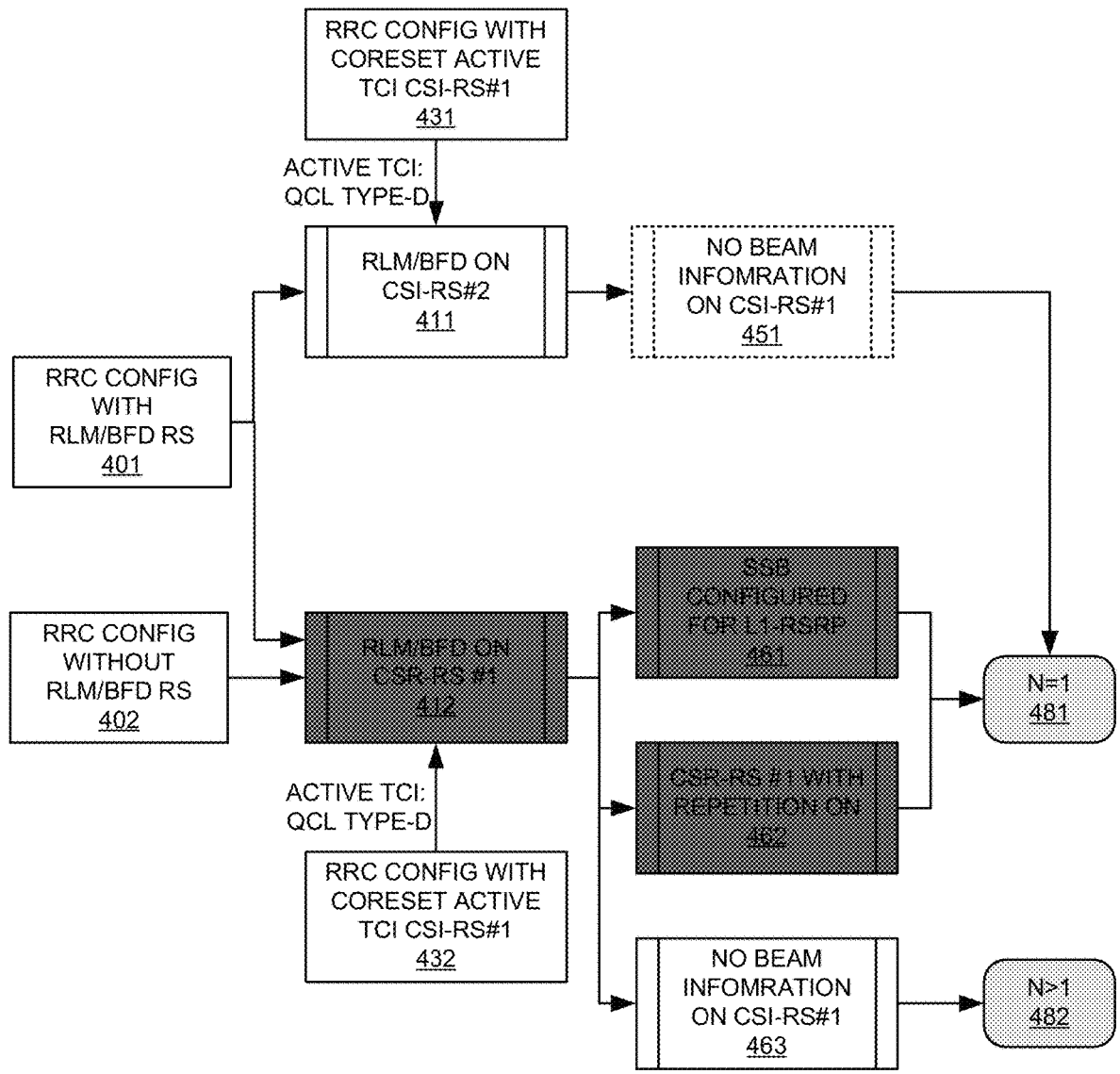
FIG. 4 illustrates exemplary diagrams for BFD RS configuration scenarios based on the received RRC configuration in accordance with embodiments of the current invention.

FIG. 4 illustrates exemplary diagrams for BFD RS configuration scenarios based on the received RRC configuration in accordance with embodiments of the current invention. The RRC configuration, in 401, may explicitly configure BFD RS. Explicit BFD RS configuration 401 may configure, in 411, the BFD RS as CSI-RS#2. CSI-RSI#1, in 431, is the active state TCI with QCL type-D configured. In another embodiment, in 451, the CSI-RS#1 may not be configured with RS beam information for the configuration 411. In some embodiment, the N factor can be equal to one.

In a second scenario, the explicitly configured 401 is configured with RLM/BFD RS on CSI-RS#1 412. RRC configuration with CORESET active TCI CSI-RS#1 432 is QCL type-D configured. In a third scenario, the implicitly configured 402 is configured with 412. In one embodiment, CSI-RS#1 TCI state is activated by MAC-CE command. In one embodiment, RRC is configured with configuration 412 and CSI-RS#1 configuration 432. In 461 SSB#1 is configured in its TCI state with 'Type D' QCL information. The RS beam information is provided in this RRC configuration and the N factor equals one in 481. In another embodiment, RRC is configured with configuration 412 and CSI-RS#1 configuration 432. In 462, CSI-RS resource set #1 is configured with repetition ON is configured in its TCI state with 'Type D' QCL information. The RS beam information is provided in this RRC configuration. For this configuration, when the number of symbols in CSI-RS resource set #1 (N1) is larger than the number of UE RX beams (N2) (maxNumberRx-Beam) the N factor equals one in 481. In yet another configuration, RRC is configured with configuration 412 and CSI-RS#1 configuration 432 and no beam information on CSI-RS#1 is provided in 463. The N factor is greater than one in 482.

Figure 5:
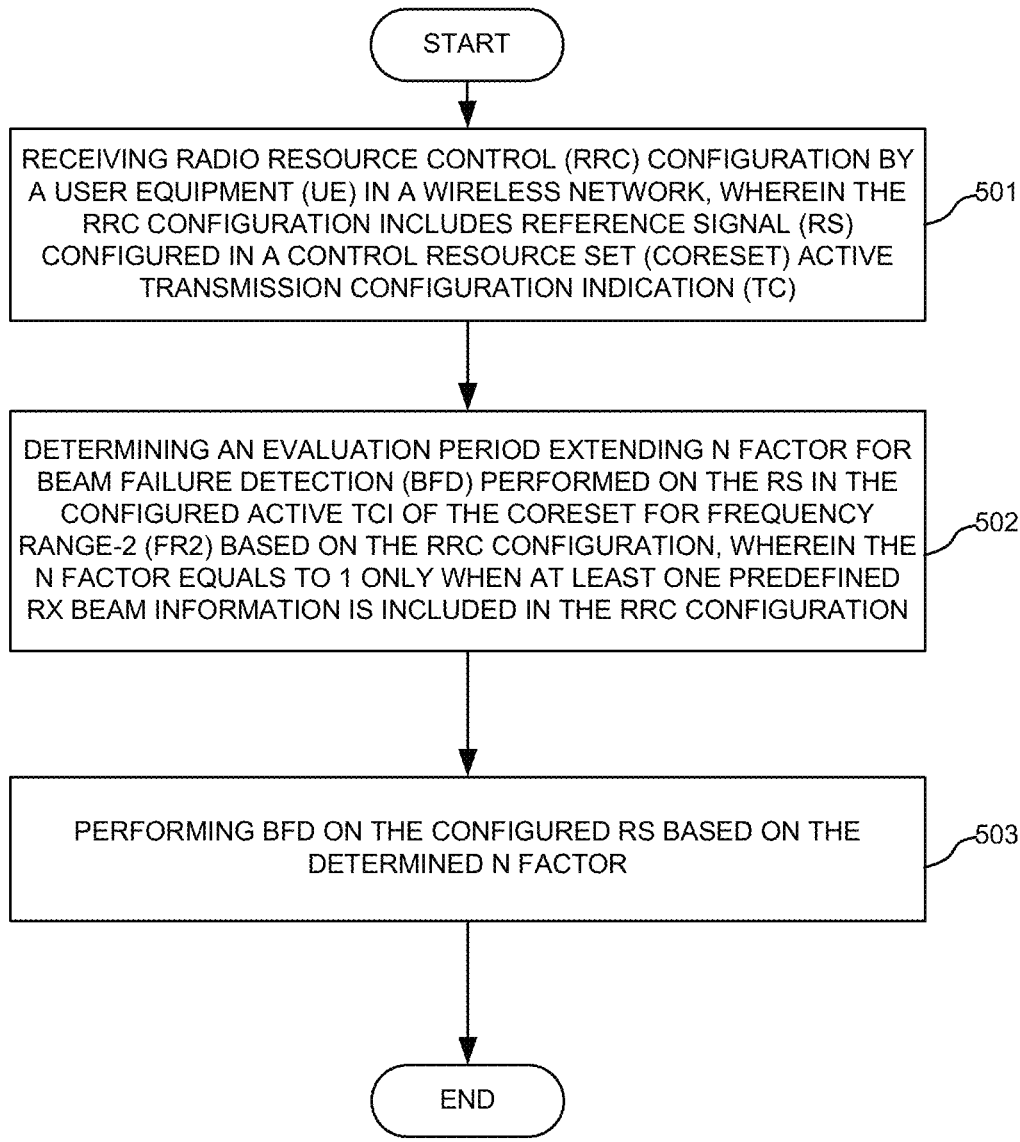
FIG. 5 illustrates an exemplary flow chart for the NR CSI-RS based BFD/RLM procedure in accordance with embodiments of the current invention.

FIG. 5 illustrates an exemplary flow chart for the NR CSI-RS based BFD/RLM procedure in accordance with embodiments of the current invention. At step 501, the UE receives radio resource control (RRC) configuration in a wireless network, wherein the RRC configuration includes reference signal (RS) configured in a control resource set (CORESET) active transmission configuration indication (TCI). At step 502, the UE determines an evaluation period extending N factor for beam failure detection (BFD) performed on the RS in the configured active TCI of the CORESET for frequency range-2 (FR2) based on the RRC configuration, wherein the N factor equals to 1 only when at least one predefined RX beam information is included in the RRC configuration. At step 503, the UE performs BFD on the configured RS based on the determined N factor.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving radio resource control (RRC) configuration by a user equipment (UE) in a wireless network, wherein the RRC configuration includes reference signal (RS) configured in a control resource set (CORESET) active transmission configuration indication (TCI);
determining an evaluation period extending N factor for beam failure detection (BFD) performed on the RS in the configured active TCI of the CORESET for frequency range-2 (FR2) based on the RRC configuration, wherein the N factor equals to 1 only when at least one predefined RX beam information is included in the RRC configuration; and
performing BFD on the configured RS based on the determined N factor.

2. The method of claim 1, wherein the BFD is performed on the RS in the configured active TCI of the CORESET when a BFD RS is explicitly configured in the RRC configuration.

3. The method of claim 1, wherein the BFD is performed on the RS in the configured active TCI of the CORESET when there is no BFD RS configured in the RRC configuration.

4. The method of claim 1, wherein RS is a control state information RS (CSI-RS) in a CSI-RS resource set, and wherein the TCI state of the CSI-RS is configured with Type-D quasi-location (QCL) information.

5. The method of claim 4, wherein the predefined RX beam information for the CSI-RS is Type-D QCL information and a corresponding synchronization signal block (SSB) configured in the TCI state of the CSI-RS.

6. The method of claim 5, wherein the SSB is configured for performing layer-1 reference signal received power (L1-RSRP) measurement, wherein L1-RSRP is configured via RRC signaling.

7. The method of claim 4, wherein the predefined RX beam information for the CSI-RS is another CSI-RS resource in a resource set configured with repetition ON, and wherein N factor equals to 1 when a number of symbols in the CSI-RS resource set is greater than a number of RX beams for the UE.

8. The method of claim 7, further comprising: performing layer-1 reference signal received power (L1-RSRP) measurement on the CSI-RS resource set, wherein L1-RSRP is configured via RRC signaling.

9. A user equipment (UE), comprising:
a transceiver that transmits and receives radio frequency (RF) signal with a base station in a wireless network;
a configuration receiver that receives radio resource control (RRC) configuration, wherein the RRC configuration includes reference signal (RS) configured in a control resource set (CORESET) active transmission configuration indication (TCI);
a configurator that determines an evaluation period extending N factor for beam failure detection (BFD) performed on the RS in the configured active TCI of the CORESET for frequency range-2 (FR2) based on the RRC configuration, wherein the N factor equals to 1 only when at least one predefined RX beam information is included in the RRC configuration; and
a BFD controller that performs BFD on the configured RS based on the determined N factor.

10. The UE of claim 9, wherein the BFD is performed on the RS in the configured active TCI of the CORESET when a BFD RS is explicitly configured in the RRC configuration.

11. The UE of claim 9, wherein the BFD is performed on the RS in the configured active TCI of the CORESET when there is no BFD RS configured in the RRC configuration.

12. The UE of claim 9, wherein RS is a control state information RS (CSI-RS) in a CSI-RS resource set, and wherein the TCI state of the CSI-RS is configured with Type-D quasi-location (QCL) information.

13. The UE of claim 12, wherein the predefined RX beam information for the CSI-RS is Type-D QCL information and a corresponding synchronization signal block (SSB) configured in the TCI state of the CSI-RS.

14. The UE of claim 13, wherein the SSB is configured for performing layer-1 reference signal received power (L1-RSRP) measurement, wherein L1-RSRP is configured via RRC signaling.

15. The UE of claim 12, wherein the predefined RX beam information for BFD is the CSI-RS resource set is configured with repetition ON, and wherein N factor equals to 1 when a number of symbols in the CSI-RS resource set is greater than a number of RX beams for the UE.

16. The UE of claim 15, wherein the BFD controller further performs layer-1 reference signal received power (L1-RSRP) measurement on the CSI-RS resource set, wherein L1-RSRP is configured via RRC signaling.

* * * * *